(12) United States Patent
Koga

(10) Patent No.: US 12,515,343 B2
(45) Date of Patent: Jan. 6, 2026

(54) FOLLOWING ROBOT

(71) Applicant: FANUC CORPORATION, Yamanashi (JP)

(72) Inventor: Kentaro Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 236 days.

(21) Appl. No.: 17/918,400

(22) PCT Filed: May 14, 2021

(86) PCT No.: PCT/JP2021/018348
§ 371 (c)(1),
(2) Date: Oct. 12, 2022

(87) PCT Pub. No.: WO2021/235331
PCT Pub. Date: Nov. 25, 2021

(65) Prior Publication Data
US 2023/0138649 A1 May 4, 2023

(30) Foreign Application Priority Data
May 19, 2020 (JP) .................... 2020-087367

(51) Int. Cl.
*B25J 9/16* (2006.01)
*B25J 13/08* (2006.01)

(52) U.S. Cl.
CPC ............ *B25J 9/1697* (2013.01); *B25J 13/08* (2013.01)

(58) Field of Classification Search
CPC ........ B25J 9/1697; B25J 13/08; B25J 9/1684; B25J 9/0093; G05B 2219/39102; G05B 2219/39529; G05B 2219/40613
See application file for complete search history.

(56) References Cited

U.S. PATENT DOCUMENTS

| | | | |
|---|---|---|---|
| 3,744,032 A * | 7/1973 | Engelberger | G05B 19/425 901/3 |
| 4,675,502 A * | 6/1987 | Haefner | B25J 9/1684 901/3 |

(Continued)

FOREIGN PATENT DOCUMENTS

| JP | H08-072764 A | 3/1996 |
|---|---|---|
| JP | 2001-252886 A | 9/2001 |

(Continued)

OTHER PUBLICATIONS

International Search Report mailed Jul. 6, 2021, in corresponding to International Application No. PCT/JP2021/018348; 5 pages (with English Translation).

*Primary Examiner* — Dylan M Katz
(74) *Attorney, Agent, or Firm* — Maier & Maier, PLLC

(57) ABSTRACT

A following robot including an arm, at least one visual sensor, a feature-value storage unit that stores, as target data for causing the visual sensor to follow a follow target, first feature values related to at least the position and the orientation of the follow target, a feature-value detecting unit for detecting, by using an image acquired by the visual sensor, second feature values related to at least current position and orientation of the follow target, a movement-amount computing unit computing a movement instruction based on differences between the second feature values and the first feature values and adjusting the movement instruction by using at least feedforward control, a movement instructing unit which moves the arm based on the movement instruction, and an input-value storage unit that stores a signal acquired when a specific motion of the follow target is started and an input value for the feedforward control.

4 Claims, 13 Drawing Sheets

(56) References Cited

U.S. PATENT DOCUMENTS

| | | |
|---|---|---|
| 2011/0087360 A1 | 4/2011 | Chen et al. |
| 2011/0208347 A1* | 8/2011 | Otake ................... B25J 9/1697 |
| | | 700/174 |
| 2017/0274534 A1 | 9/2017 | Takahashi et al. |
| 2019/0061167 A1* | 2/2019 | Yoshino ................... B25J 13/06 |
| 2019/0240841 A1 | 8/2019 | Ooba |
| 2019/0275678 A1 | 9/2019 | Takeuchi |
| 2019/0299405 A1 | 10/2019 | Warashina et al. |
| 2019/0321984 A1 | 10/2019 | Yamazaki |
| 2020/0238518 A1 | 7/2020 | Ooba |
| 2023/0260071 A1* | 8/2023 | Chavez ................. G06T 1/0014 |
| | | 382/153 |

FOREIGN PATENT DOCUMENTS

| | | |
|---|---|---|
| JP | 2007-066001 A | 3/2007 |
| JP | 2017-170599 A | 9/2017 |
| JP | 2018-83284 A | 5/2018 |
| JP | 2019-136808 A | 8/2019 |
| JP | 2019-171540 A | 10/2019 |
| JP | 2019-188587 A | 10/2019 |
| JP | 2020-116687 A | 8/2020 |
| JP | 6836606 B | 3/2021 |

\* cited by examiner

FOLLOWING ROBOT

TECHNICAL FIELD

This disclosure relates generally to a following robot.

BACKGROUND

In the related art, there is a known production line including a robot, a conveying device that conveys an item, a rail provided along the conveying device, and a moving device that moves the robot along the rail (for example, see Japanese Unexamined Patent Application, Publication No. H08-72764).

With this production line, the robot performs defect inspection and polishing of the item when the item is being conveyed by the conveying device. In addition, when the defect inspection and polishing are being performed, the moving device moves the robot along the rail at the same velocity as the velocity at which the item is conveyed by the conveying device.

In addition, there is a known technology for accurately aligning the position and orientation of a distal-end portion of the robot with a stationary target position (for example, see Japanese Unexamined Patent Application, Publication No. 2019-170599).

SUMMARY

Technical Problem

With the abovementioned production line, the robot merely performs the defect inspection and the polishing. In contrast, for example, when performing work in which interference can occur between the robot and the item, it is necessary to provide a measure for preventing damage to the robot, the conveying device, the item, and so forth. However, it is difficult to realize damage prevention because the item being moved by the conveying device may possibly behave in an unpredictable manner, such as being vibrated.

Therefore, there is a demand for causing a tool of a robot to accurately follow an item.

SUMMARY

An aspect of the present disclosure is a following robot including: a movable arm; at least one visual sensor provided on the arm; a feature-value storage unit that stores, as target data for causing the visual sensor provided on the arm to follow a follow target, first feature values related to at least a position and an orientation of the follow target; a feature-value detecting unit which detects, by using an image acquired by the visual sensor, second feature values related to at least a current position and a current orientation of the follow target; a movement-amount computing unit which computes a movement instruction for the arm based on differences between the second feature values and the first feature values and which adjusts the movement instruction by using at least feedforward control; a movement instructing unit which moves the arm based on the movement instruction; and an input-value storage unit that stores a signal acquired when a specific motion of the follow target is started and an input value for the feedforward control for causing the arm to follow a trajectory of the follow target in the specific motion in association with each other, wherein the movement-amount computing unit and the movement instructing unit repeat, while the visual sensor is following the follow target, computing the movement instruction and moving the arm based on the movement instruction, the movement instruction is for reducing or eliminating differences between at least the current position and the current orientation of the follow target, serving as the second feature values, and at least the position and the orientation of the follow target, serving as the first feature values, and the movement-amount computing unit uses the feedforward control based on the input value stored in the input-value storage unit in association with the signal acquired when the specific motion is started.

DETAILED DESCRIPTION OF THE EMBODIMENTS

A work robot system 1 according to an embodiment of the present disclosure will be described below with reference to the drawings.

Figure 1:
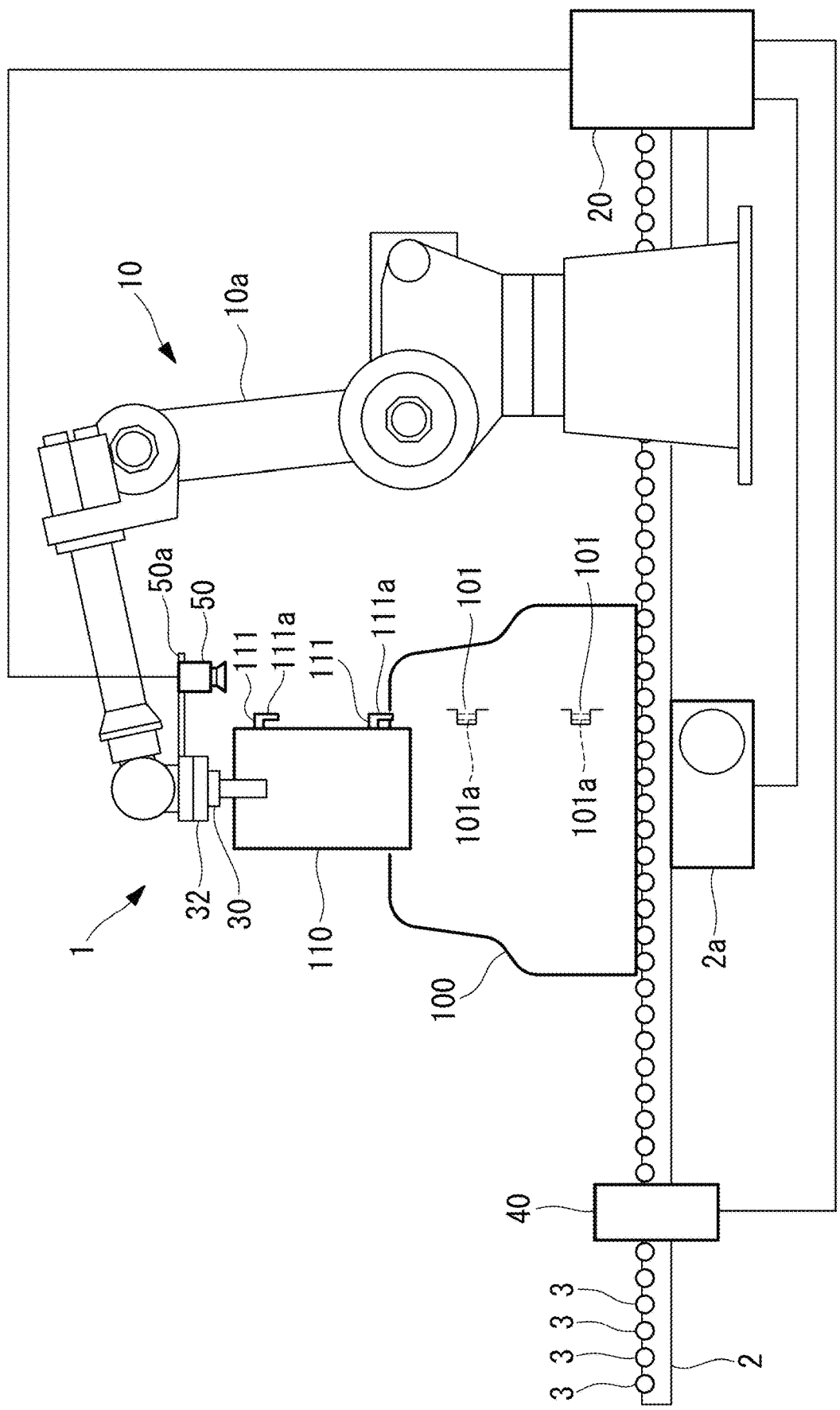
FIG. 1 is a configuration diagram showing, in outline, a work robot system including a following robot according to an embodiment of the present disclosure.

As shown in FIG. 1, the work robot system 1 of this embodiment includes a conveying device 2 that conveys an item 100, which is a work target, and a robot (following robot) 10 that performs predetermined work on a work target portion 101 of the item 100 conveyed by the conveying device 2. In addition, the work robot system 1 includes: a controller 20 that controls the robot 10; a detection device 40 that serves as a detection unit; and a visual sensor 50 attached to the robot 10.

The detection device 40 detects the item 100 that has been conveyed to a predetermined position. It is possible to employ any device having such a function as the detection device 40. Although the detection device 40 is a photoelectric sensor in this embodiment, the item 100 that has been conveyed to the predetermined position may be detected by the visual sensor 50.

The item 100 is not limited to a particular type of item. In this embodiment, the item 100 is a vehicle body as an example. The conveying device 2 conveys the item 100 by driving some of a plurality of rollers 3 by means of a motor 2a. In this embodiment, the conveying device 2 conveys the item 100 toward the right side in FIG. 1.

The work target portion 101 is a portion in the item 100 on which the robot 10 performs the predetermined work. In this embodiment, the predetermined work refers to work in which the robot 10 lifts a component 110 by using a hand (tool) 30 thereof, and the robot 10 attaches an attaching portion 111 of the component 110 to the work target portion 101. By doing so, for example, a shaft 111a extending downward from the attaching portion 111 of the component 110 is fitted into a hole 101a provided in the work target portion 101 of the item 100.

The robot 10 attaches the attaching portion 111 of the component 110 to the work target portion 101 in the state in which the item 100 is being moved by the conveying device 2.

Figure 2:
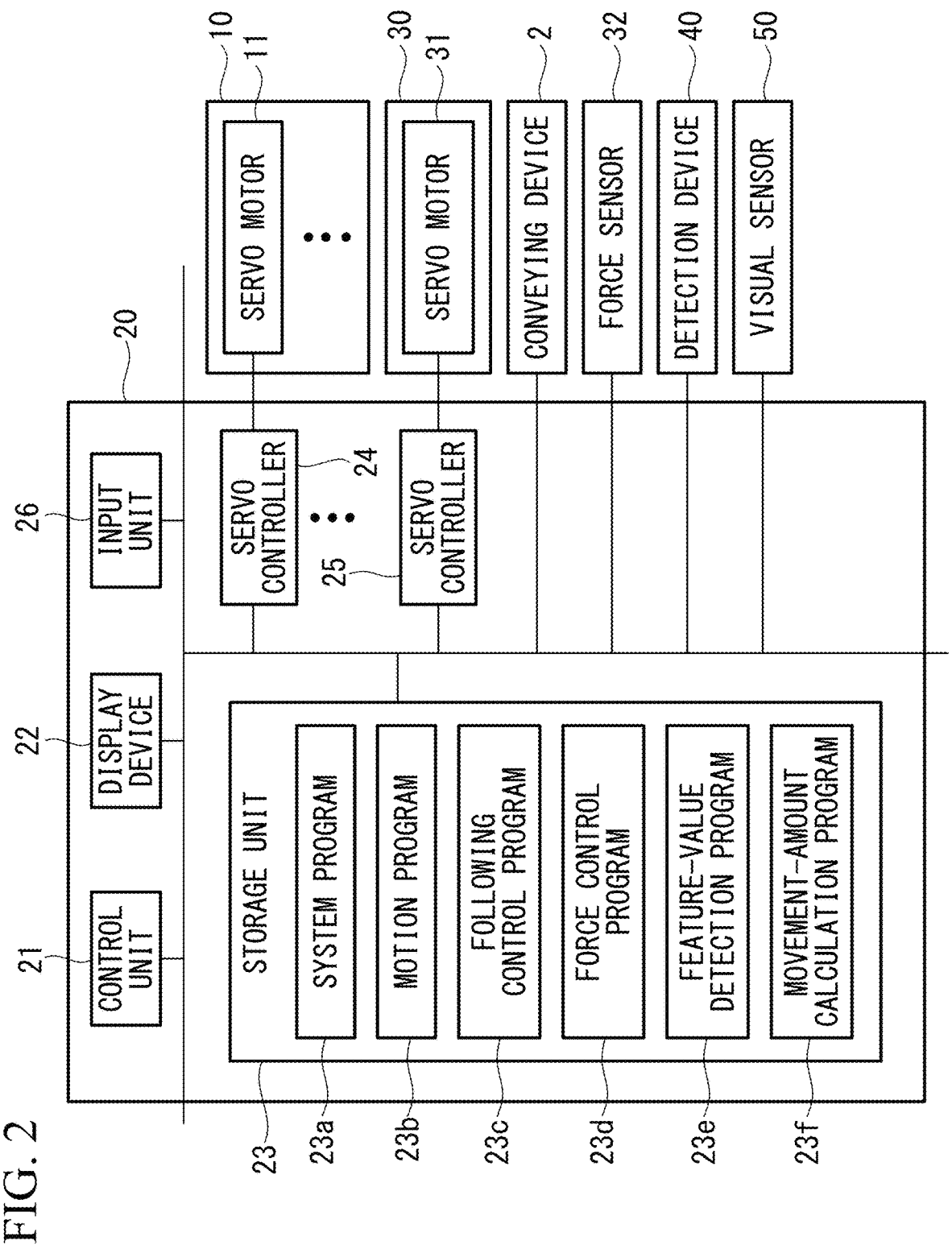
FIG. 2 is a block diagram of a controller of the work robot system in FIG. 1.

Although the robot 10 is not limited to a particular type, the robot 10 of this embodiment includes a plurality of servo motors 11 that respectively drive a plurality of movable arms 10a (see FIG. 2). Each of the servo motors 11 has an operating-position detection device for detecting the operating position thereof, and an example of the operating-position detection device is an encoder. The detection value detected by the operating-position detection device is transmitted to the controller 20.

The hand 30 is attached to a distal-end portion of the arm 10a. Although the hand 30 of this embodiment supports the component 110 by gripping the component 110 by using a plurality of claws, it is also possible to employ a hand that supports the component 110 by means of a magnetic force, air suction, or the like.

The hand 30 includes a servo motor 31 that drives the claws (see FIG. 2). The servo motor 31 has an operating-position detection device for detecting the operating position thereof, and an example of the operating-position detection device is an encoder. The detection value detected by the operating-position detection device is transmitted to the controller 20.

As the individual servo motors 11 and 31, various types of servo motors, such as rotary motors and linear motors, can be employed.

A force sensor 32 is attached to a distal-end portion of the robot 10. The force sensor 32 measures forces or moments, for example, in an X-axis direction, a Y-axis direction, and a Z-axis direction, shown in FIG. 3, as well as forces or moments around the X axis, around the Y axis, and around the Z axis.

It is satisfactory so long as the force sensor 32 is capable of detecting the direction of a force and the magnitude of the force acting on the hand 30 or the component 110 gripped by the hand 30. Accordingly, although the force sensor 32 is provided between the robot 10 and the hand 30 in this embodiment, the force sensor 32 may be provided inside the hand 30.

The visual sensor 50 is attached to the distal-end portion of the arm 10a. In one example, the visual sensor 50 is attached to a wrist flange of the robot 10 by means of a frame 50a. The visual sensor 50 is a two-dimensional camera in this embodiment. The visual sensor 50 in this embodiment sequentially acquires image data, as shown in FIG. 3, so that a follow target 102, in which the position and the orientation thereof do not change relative to the work target portion 101, is in a predetermined area of the angle of view.

Figure 3:
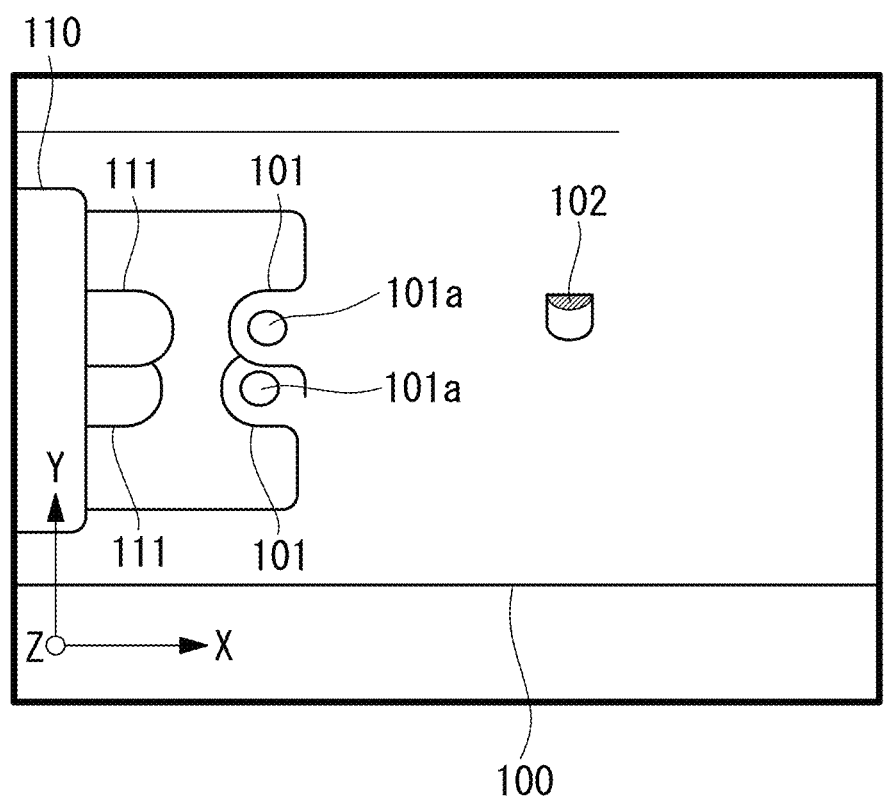
FIG. 3 shows an example of image data captured by a visual sensor of the work robot system in FIG. 1.

Although the follow target 102 in this embodiment is a top surface portion indicated by hatching in FIG. 3, it is also possible to employ another portion whose position and orientation do not change relative to the work target portion 101.

The visual sensor 50 may be attached to a tool such as the hand 30. In addition, the visual sensor 50 may be attached to another portion in the robot 10. The relative position and orientation of the other portion do not change with respect to a tool such as the hand 30.

The visual sensor 50 sequentially transmits the image data to the controller 20. The image data are data with which the position and the orientation of the follow target 102 can be identified. The image data may be processed by a detector other than the controller 20 and the position and the orientation of the follow target 102 may be identified on the basis of the processed data.

The follow target 102 is a portion that has a predetermined shape, a portion in which a predetermined mark is provided, or the like in the item 100. In such a case, the image data are data with which the position and the orientation of the aforementioned portion can be discriminated in an image.

In an example in which an image is employed as a basis, when the follow target 102 is disposed with respect to the visual sensor 50 so as to be disposed in accordance with a target position, orientation, or size in the image data (detection area), the position and the orientation of the hand 30 attached to the arm 10a are set at the position and the orientation required for performing the predetermined work on the item 100. In an example in which the position is employed as a basis, the position and the orientation of the hand 30 attached to the arm 10a and the position and the orientation of the visual sensor 50 are associated with each other by means of calibration. In this case, the controller 20 can recognize, on the basis of the image data, the position and the orientation of the follow target 102 in the coordinate system of the robot 10, and the controller 20 can move the hand 30 provided on the arm 10a to the position and the orientation required for performing the predetermined work.

In this embodiment, a state in which the shaft 111a of the attaching portion 111 of the component 110 can be fitted into the hole 101a provided in the work target portion 101 of the item 100 is achieved.

There are cases in which the item 100 shakes on the conveying device 2. For example, the item 100 shakes in the case in which the plurality of rollers 3 of the conveying device 2 are not disposed on a completely flat surface. In the case in which the item 100 is large, slight shaking at a bottom end of the item 100 results in large shaking of the work target portion 101 in some cases. Accordingly, it is important to adjust the orientation of the hand 30 provided on the arm 10a.

In an example in which an image is employed as a basis, changes in the position, the orientation, and the size of the follow target 102 in the image data acquired by the visual sensor 50 and changes in the position and the orientation in the coordinate system of the robot 10 are associated with each other in advance in the controller 20.

As shown in FIG. 2, the controller 20 includes: a control unit 21 having a CPU, a RAM, and so forth; a display device 22; and a storage portion (feature-value storage portion, input-value storage portion) 23 having a non-volatile storage, a ROM, and so forth. In addition, the controller 20 includes: a plurality of servo controllers 24 that respectively correspond to the servo motors 11 of the robot 10; a servo controller 25 that corresponds to the servo motor 31 of the hand 30; and an input unit 26 that is connected to the controller 20. In one example, the input unit 26 is an input device such as an operation board that can be carried by an operator. There are cases in which the input unit 26 wirelessly communicates with the controller 20.

The storage portion 23 stores a system program 23a and the system program 23a performs basic functions of the controller 20. In addition, the storage portion 23 stores a motion program 23b. The storage portion 23 additionally stores a following control program (movement instructing means) 23c, a force control program 23d, a feature-value detection program (feature-value detecting means) 23e, and a movement-amount calculation program (movement-amount calculating means) 23f.

In addition, the storage portion (input-value storage portion) 23 stores signals acquired when the follow target 102 starts a specific motion and input values for feedforward control in association with each other.

Here, the specific motion of the follow target 102 is a non-routine motion that is expected while the conveying device 2 conveying the item 100 is in operation, and refers to stopping due to other work steps, restarting from a stop, an emergency stop, or the like. When such a specific motion starts, the controller 20 acquires signals with which each specific motion can be identified.

Figure 4:
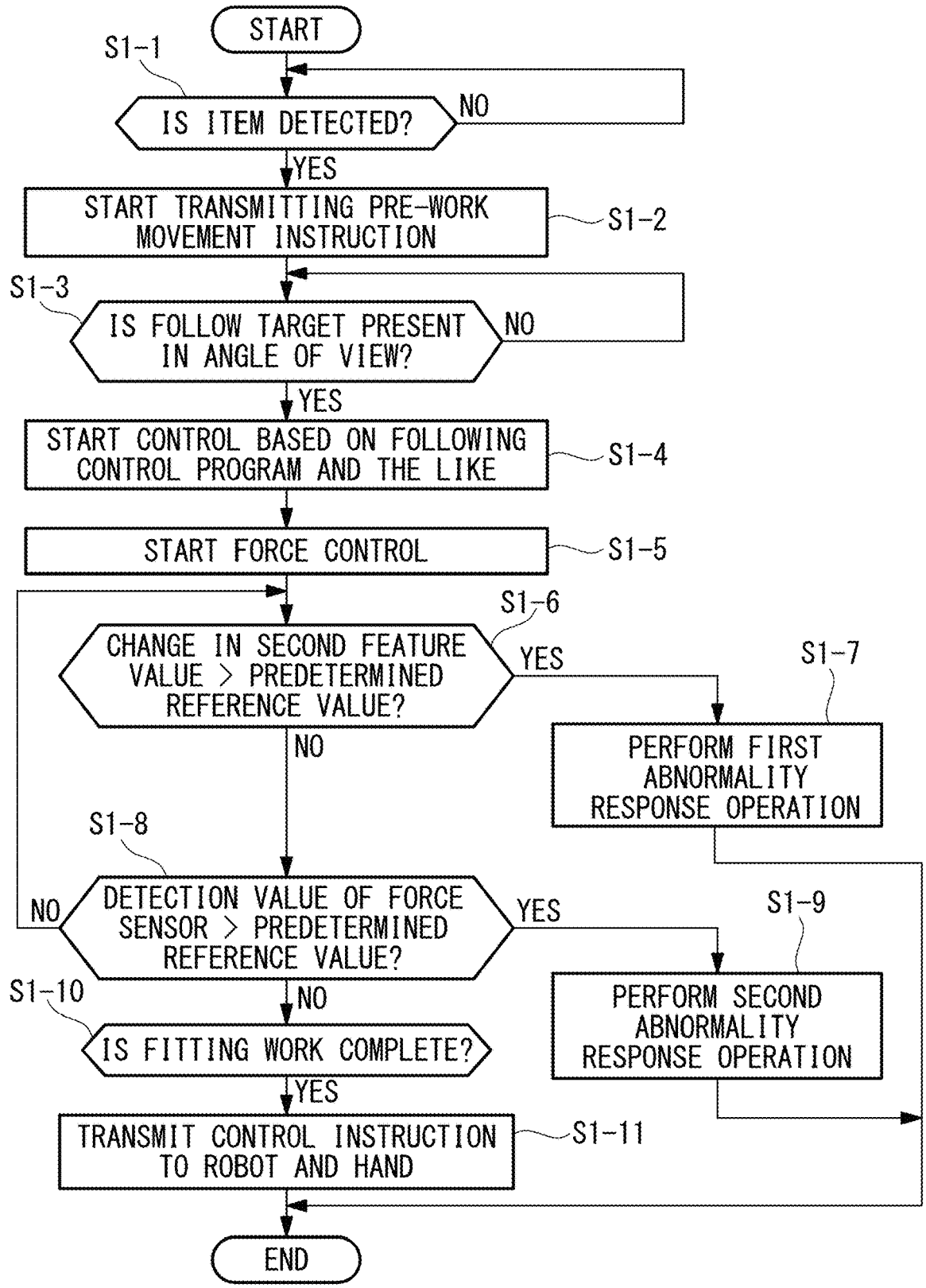
FIG. 4 is a flowchart indicating the operation of a control unit of the work robot system in FIG. 1.

The control unit 21 transmits, on the basis of the aforementioned programs, movement instructions for performing the predetermined work on the item 100 to the respective servo controllers 24 and 25. Accordingly, the robot 10 and the hand 30 perform the predetermined work on the item 100. The operation of the control unit 21 will be described with reference to the flowchart in FIG. 4.

First, when the detection device 40 detects the item 100 (step S1-1), the control unit 21 starts to transmit pre-work movement instructions based on the motion program 23b to the robot 10 and the hand 30 (step S1-2). Accordingly, the robot 10 brings the shaft 111a of the component 110 gripped by the hand 30 close to the hole 101a of the work target portion 101. At this time, the control unit 21 may employ data about the conveyance velocity of the conveying device 2, the position of the work target portion 101 in the item 100, or the like. In addition, after step S1-4 described later, the shaft 111a of the component 110 is fitted into the hole 101a of the item 100 on the basis of the motion program 23b. Note that, in step S1-1, the visual sensor 50 may detect the item 100 instead of the detection device 40.

As a result of the control of the robot 10 performed in step S1-2, the component 110 reaches a preparatory position and orientation for performing the predetermined work (fitting). When the follow target 102 starts to exist in the angle of view (detection area) of the visual sensor 50 or in a predetermined area of the angle of view (step S1-3), the control unit 21 starts to perform control based on the following control program 23c, the feature-value detection program 23e, and the movement-amount calculation program 23f (step S1-4). In step S1-4, for example, the control described below is performed. Note that, in the control described below, at least the position and the orientation of the follow target 102 are detected on the basis of the image data acquired by the visual sensor 50, and, on the basis of the detected position and orientation, the control unit 21 causes the position and the orientation of the visual sensor 50 attached to the arm 10a to follow the follow target 102. Here, because the position and the orientation of the visual sensor 50 are fixed with respect to the hand 30, the hand 30 of the robot 10 follows the item 100 in a manner in which the follow target 102 is constantly disposed at the target position and orientation in the image data acquired by the visual sensor 50.

Such control is realized by means of, for example, the control described below.

In said control, the storage portion 23 stores, as first feature values, a target position, a target orientation, and a target size at which the follow target 102 should be disposed in the image data. The target size is, for example, the size of an outline in the case in which the outline is employed as a feature.

The control unit 21 detects, as detection of second feature values, the position, the orientation, and the size of the follow target 102 in the image data sequentially acquired by the visual sensor 50, on the basis of the feature-value detection program 23e.

For example, the control unit 21 performs, while performing projective transformation of a model of the follow target 102 stored in the storage portion 23, a matching search between the model that is subjected to the projective transformation and the follow target 102 in the image data and thereby detects the position and the orientation of the follow target 102. Said model may be created by employing CAD data or the like or may be created from an actual target. Because the relative position and the relative orientation between the work target portion 101 and the follow target 102 are fixed, the control unit 21 can obtain, on the basis of the position and the orientation of the follow target 102, the relative position and the relative orientation between the distal-end portion of the arm 10a and the follow target 102.

The control unit 21 calculates, on the basis of the movement-amount calculation program 23f, movement instructions for matching the position, the orientation, and the size of the follow target 102 in the image data with the first feature values.

The calculated movement instructions are for eliminating or reducing differences between the position, the orientation, and the size of the follow target 102 in the image data and the first feature values. The calculated movement instructions are for changing, for example, the position of the hand 30 attached to the arm 10a in the X-axis direction, the Y-axis direction, and the Z-axis direction and for changing the orientation of the hand 30 around the X axis, around the Y axis, and around the Z axis.

Note that, in the above-described control, the control unit 21 may additionally adjust the calculated movement instructions on the basis of parameters defined on the basis of mechanical properties of the arm 10a. For example, the mechanical properties include the rigidity of the entirety or a portion of the arm 10a, the rigidities of the respective movable portions, the weight of the hand 30, the weight of the component 110, moments or the like that the arm 10a receives due to the weights of the hand 30 and the component 110, and so forth. In addition, the deflection amount, the direction, and so forth of the arm 10a change in accordance with the angles of joints, which are movable portions of the arm 10a; therefore, states of the respective movable portions of the arm 10a are also included in the mechanical properties.

In other words, in the case in which the orientation of the arm 10a changes due to the movement instructions, the moments that the arm 10a receives due to the weights of the hand 30 and the component 110 and so forth and the states of the respective movable portions of the arm 10a and so forth change in accordance with said change in the orientation. Because of this, as a result of adjusting the movement instructions in consideration of these mechanical properties, it is possible to cause the hand 30 to more accurately follow the item 100.

The control unit 21 can obtain a trend in changes of the second feature values by employing a plurality of continuous image data. For example, when the position, the orientation, and the size of the follow target 102 in the image data acquired by the visual sensor 50 gradually approach the first feature values, which are the target data, trends in changes in the relative position and the relative orientation of the visual sensor 50 with respect to the follow target 102 are obtained from the plurality of continuous image data.

In the case in which there are trends in changes in the relative position and the relative orientation, the control unit 21 may adjust, on the basis of the movement-amount calculation program 23f, the movement instructions by employing feedforward control based on said trends. For example, an average velocity may be determined from changes in the movement amounts, and said basic velocity may be imparted so as to serve as the feedforward control.

In a state in which the relative velocity with respect to the target is kept constant to some extent by employing the feedforward control, it becomes possible to perform feedback control for a displacement amount. If feedforward control is not employed, there can be a moment at which the movement velocity of the robot reaches zero when the features in images match with each other. In this case, deceleration and acceleration can occur at a high frequency; however, it is possible to prevent such deceleration and acceleration by employing the feedforward control.

It is preferable to apply well-known filtering, smoothing, or the like, such as a moving average, to correction data to be subjected to the feedforward control. Accordingly, when changes in the position and the orientation of the item 100 due to a disturbance, shaking of the item 100 due to the precision of the conveying device 2, the possibility of overshooting, electrical noise, and so forth are detected, the control unit 21 can appropriately cope with the changes due to a disturbance or shaking due to the precision of the conveying device 2, reduce overshooting, remove electrical noise, and so forth.

An input value, such as the basic velocity, to be imparted in the feedforward control may be arbitrarily input by a user on the basis of a value measured by using an external measuring instrument.

In addition, a robot model in which decelerator deflection (torsion) is taken into consideration may be created, and arm vibrations may be reduced by estimating arm vibrations and employing said estimation in feedback control.

In this embodiment, the feedforward control is performed, by assuming a case in which the follow target 102 performs the specific motion, to be a case in which there are trends in changes in the relative position and the relative orientation. Specifically, in the case in which acquisition of a signal of a time when the follow target 102 starts the specific motion is performed, the input value stored in the storage portion 23 in association with said signal is read out, and the feedforward control is performed on the basis of said input value.

The input value for the feedforward control is acquired in advance by means of a method described below.

Figure 5:
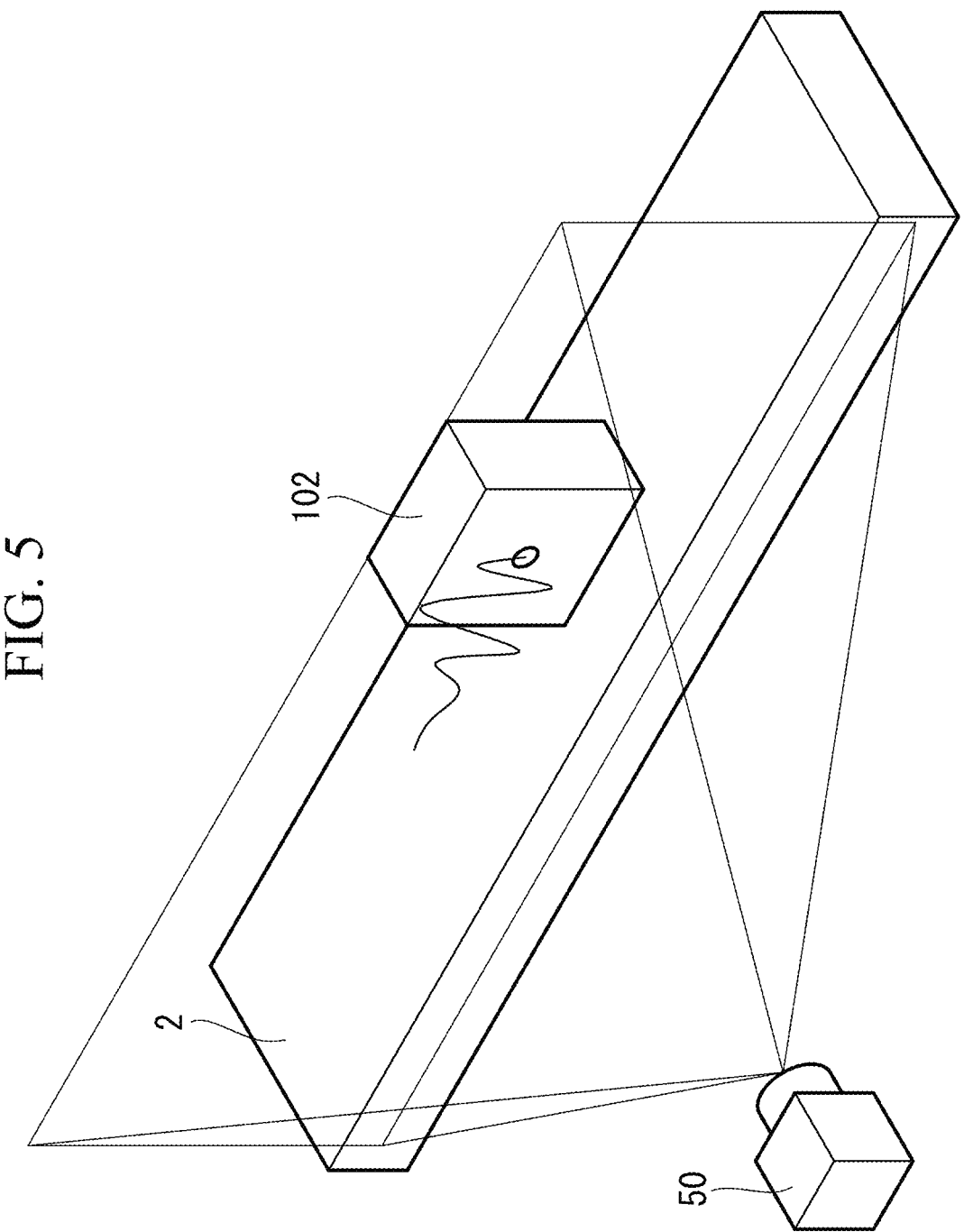
FIG. 5 is a schematic perspective view showing an example of feedforward-control input value generation for a specific motion of a follow target of the work robot system in FIG. 1.

First, as shown in FIG. 5, the visual sensor 50 that is fixed with respect to a floor surface to which the conveying device 2 is fixed is prepared.

Figure 6:
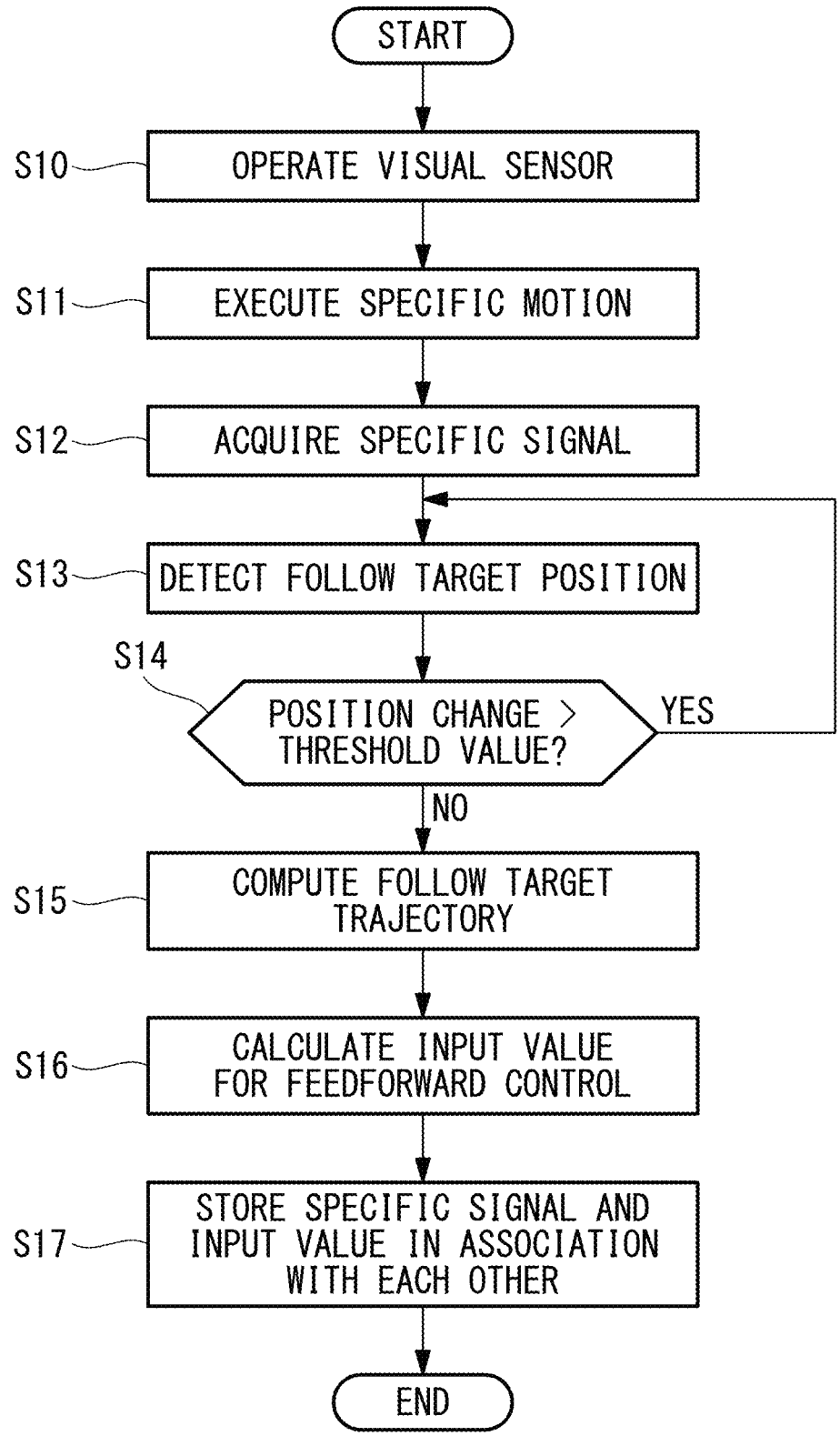
FIG. 6 is a flowchart for explaining the input-value generation processing in FIG. 5.

In this state, as shown in FIG. 6, the follow target 102 is disposed in the angle of view of the visual sensor 50 and the visual sensor 50 is operated (step S10). Next, the above-described specific motion is executed (step S11). For example, when an emergency stop of the conveying device 2 is executed, the controller 20 acquires an emergency stop signal (specific signal) with which the emergency stop can be identified (step S12).

Accordingly, the follow target 102 vibrates in accordance with the trajectory shown in FIG. 5. In order to record this trajectory, the visual sensor 50 sequentially acquires, at short time intervals, image data containing the follow target 102, and processes the acquired image data to sequentially detect the position of the follow target 102 (step S13).

Thus, changes in the detected position of the follow target 102 are determined (step S14), and, in the case in which the positional changes exceed a predetermined threshold, the steps from step S13 are repeated. In the case in which the positional changes are equal to or less than the predetermined threshold in step S14, the trajectory of the follow target 102 is calculated on a robot coordinate system from the positional information of the follow target 102 acquired in a time-series manner (step S15).

Figure 7:
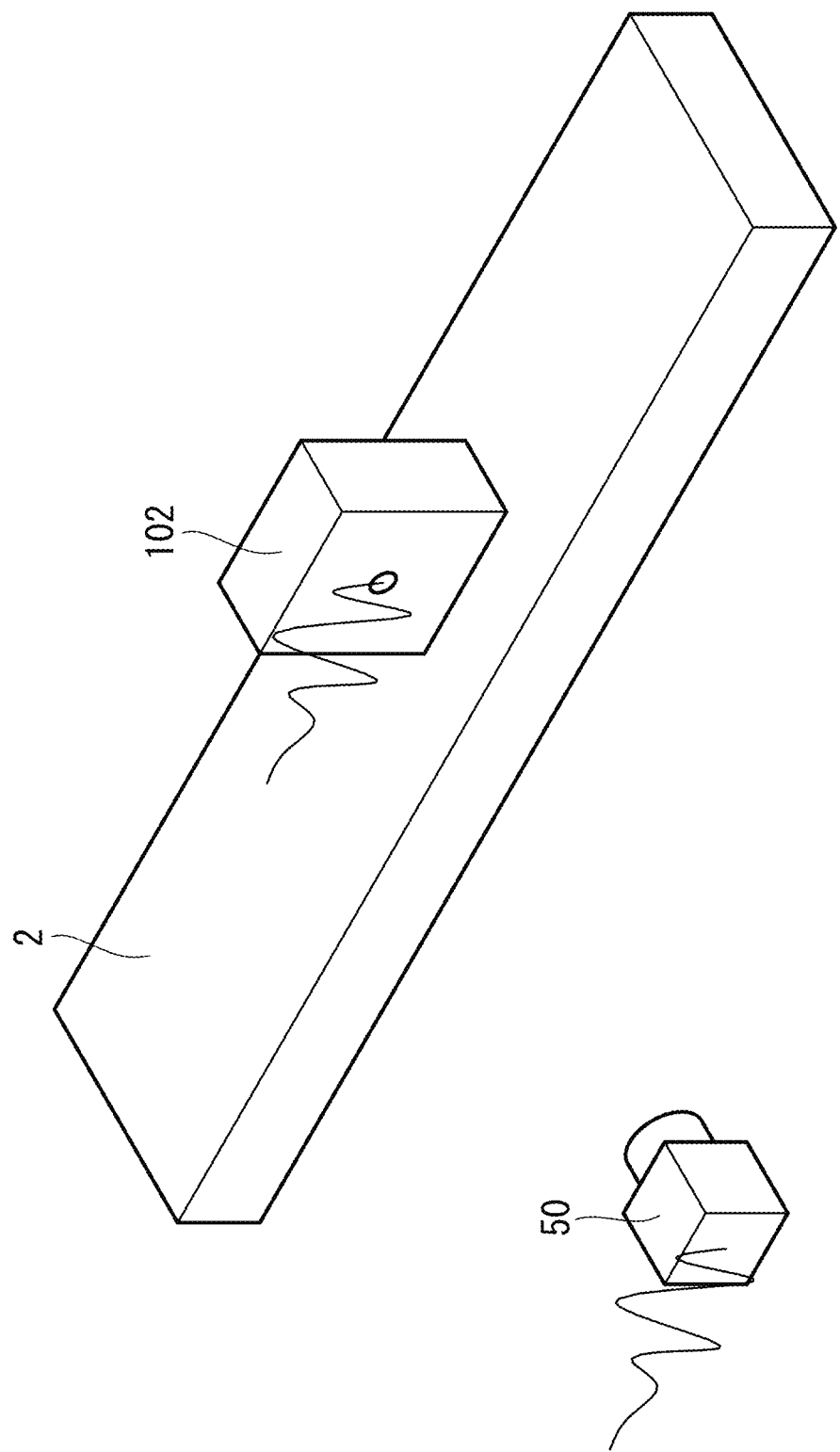
FIG. 7 is a schematic perspective view showing an example of a motion of a robot feedforward controlled by employing the input value generated by the input-value generation processing in FIG. 6.

On the basis of this trajectory of the follow target 102, input values for the feedforward control are calculated (step S16). Specifically, the input values for the feedforward control are calculated so as to be instruction signals for matching the motion trajectory of the robot 10 with the trajectory of the follow target 102, as shown in FIG. 7.

The calculated input values are instruction signals that change over a finite time period and is stored in association with a signal with which the acquired specific motion can be identified (step S17). An input value for the feedforward control is similarly calculated for each of specific motions other than an emergency stop and is stored in the storage portion 23 in association with a signal with which each of the specific motions can be identified.

Next, an input-value fine adjustment method performed in a state in which the input value for the feedforward control is stored as described above will be described.

Figure 8:
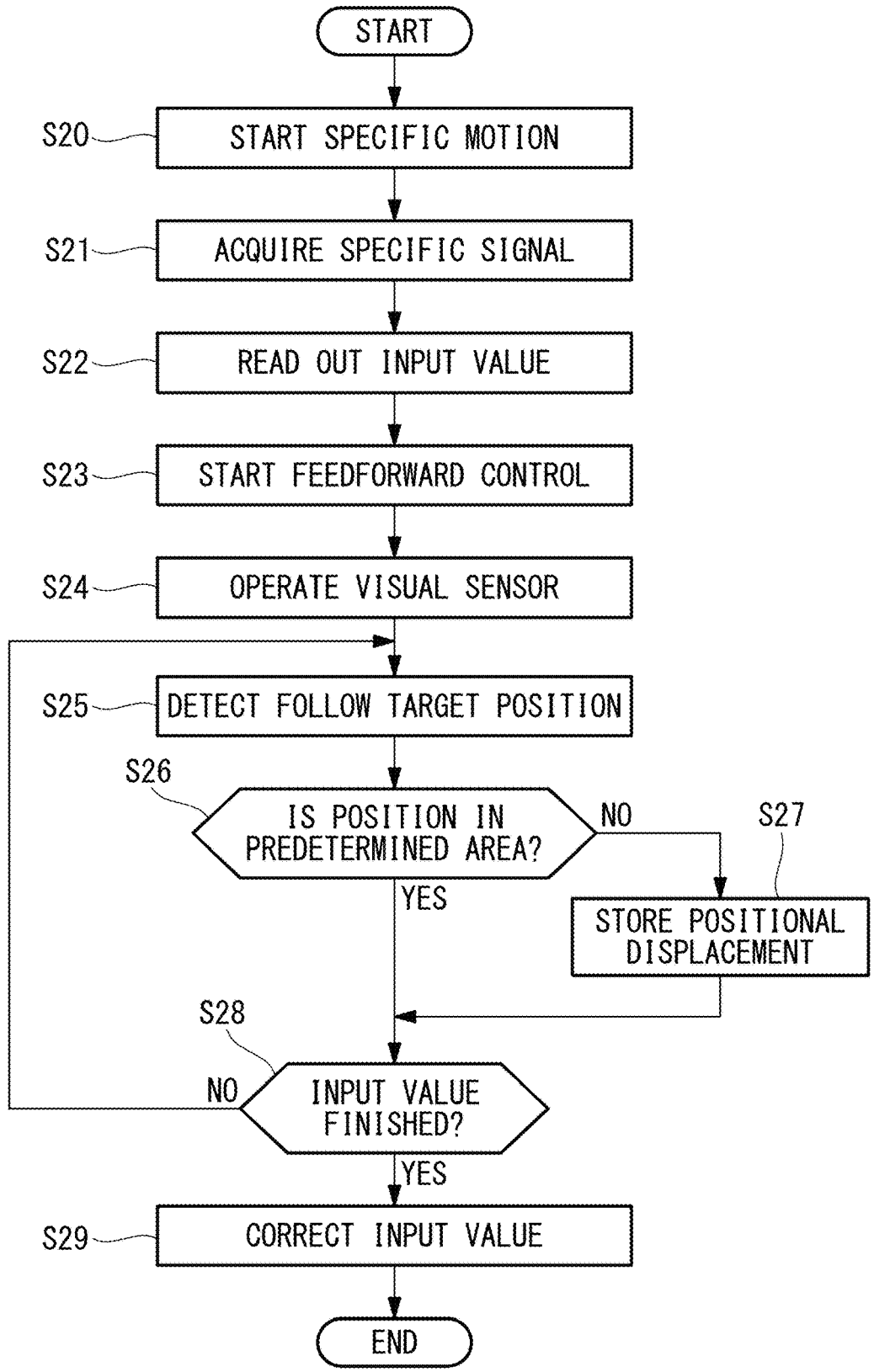
FIG. 8 is a flowchart for explaining a fine adjustment method for the input value generated by the input-value generation processing in FIG. 6.

In the state in which the robot 10 is operated, as shown in FIG. 8, the specific motion of the follow target 102 is made started (step S20). Upon starting the specific motion, the controller 20 acquires the specific signal with which the specific motion can be identified (step S21).

The controller 20 reads out the input value stored in the storage portion 23 in association with the acquired specific signal (step S22) and starts the feedforward control in which this input value is sequentially added to the instruction signal at predetermined fine time intervals (step S23). At this time, the visual sensor 50 included in the robot 10 acquires an image that contains the follow target 102 (step S24) and processes the acquired image to detect the position of the follow target 102 in the image (step S25).

In this state, whether the detected position of the follow target 102 is located in a predetermined area is sequentially determined (step S26), and, in the case in which there is a displacement beyond the predetermined area, the direction of the positional displacement of the follow target 102 and the positional displacement amount are stored in associated with the time of the input value (step S27). In the case in which the positional displacement of the follow target 102 falls within the predetermined area and after the positional displacement is stored, whether the input value has reached the end thereof is determined (step S28), and the steps from step S25 are repeated until the input value reaches the end thereof.

After the read-out input value has reached the end thereof, the input value for the feedforward control stored in the storage portion 23 is corrected on the basis of the stored positional displacement of the follow target 102 (step S29).

The input values may be finely adjusted by repeating the steps from step S20 to step S29 until the positional displacement of the follow target 102 falls within the predetermined area with respect to the input values over all of the periods.

As has been described above, there is an advantage in that it is possible to cause the tool 30 of the robot 10 to follow the item 100 in a precise manner, even if a non-routine motion of the conveying device 2 occurs during actual work by the robot 10 according to this embodiment. In addition, there is an advantage in that, when setting the input value for the feedforward control, it is possible to easily perform the setting in the case in which the visual sensor 50 equipped with the robot 10 is used.

In addition, the visual sensor 50 may be provided separately from the visual sensor 50 attached to the robot 10. In this case, the visual sensor 50 installed on and fixed to a floor surface is calibrated with respect to the coordinate system of the robot 10. In the case in which the visual sensor 50 attached to the robot 10 is employed, the robot 10 is kept in a still state. In this case, the visual sensor 50 is calibrated with respect to the coordinate system of the robot 10.

In addition, the control unit 21 may interpolate the detection results of the second feature values by employing trends in changes in the relative position and the relative orientation or the like. Accordingly, even in the case in which an acquisition cycle of the second feature values is long as with the image acquisition cycle of the visual sensor 50, it is possible to estimate the second feature values between acquisition cycles, to estimate future second feature values, and so forth as a result of interpolating the detection results.

With the above-described control, the control unit 21 causes the hand 30 of the arm 10a to follow the work target portion 101. Accordingly, the position and the orientation of the shaft 111a of the attaching portion 111 of the component 110 and the position and the orientation of the hole 101a of the work target portion 101 are aligned with each other.

Here, as described above, the changes in the position, the orientation, and the size of the follow target 102 in the image data acquired by the visual sensor 50 and the changes in the position and the orientation of the coordinate system of the robot 10 are associated with each other in the controller 20. Because of this, when the visual sensor 50 is following the follow target 102, the coordinate system of the robot 10 moves in the conveyance direction of the conveying device 2, and it is possible to match the position and the orientation of the coordinate system with the movement of the item 100 due to the conveying device 2. In this situation, although the work target portion 101 of the item 100 is being moved by the conveying device 2, the work target portion 101 appears to be nearly stopped in the coordinate system when viewed from the control unit 21.

In a state in which the control is being performed in this way, the control unit 21 starts force control on the basis of the force control program 23d (step S1-5). It is possible to employ well-known force control as the force control. In this embodiment, the robot 10 moves the component 110 in a direction for escaping from the force detected by the force sensor 32. The control unit 21 determines the movement amount thereof in accordance with the detection value of the force sensor 32.

For example, in a situation in which the shaft 111a of the component 110 gripped by the hand 30 and the hole 101a of the item 100 start to be fitted with each other, when the force sensor 32 detects a force in the opposite direction from the conveyance direction of the conveying device 2, the control unit 21 causes the component 110 to slightly move in an opposite direction from the conveyance direction to escape from the detected force.

Next, when the second feature values that are sequentially detected on the basis of the image data acquired by the visual sensor 50 fluctuate beyond a predetermined reference value (step S1-6), the control unit 21 performs a first abnormality response operation (step S1-7). A fluctuation beyond the predetermined reference value refers to a large movement of the follow target 102 in the image data, a movement of the follow target 102 in the image data that is faster than a predetermined velocity, and so forth. In the case in which the power supply is not stable, there are cases in which the rotational velocity of the motor 2a suddenly drops or the like, and there are also cases in which the rotational velocity of the motor 2a greatly fluctuates. In such cases, the position of the follow target 102 with respect to the distal-end portion of the arm 10a fluctuates beyond the predetermined reference value.

As the first abnormality response operation, the control unit 21 performs an operation for decreasing the control cycle of the force control or an operation for increasing the sensitivity of the force control, an operation for stopping the progression of fitting, an operation for stopping the fitting work, an operation for retraction in an opposite direction from the fitting direction, an operation for stopping the conveyance, an operation in which these operations are combined, or the like. Decreasing the control cycle of the force control or increasing the sensitivity thereof makes it possible to move the robot 10 in a more responsive manner with respect to a force that acts on the component 110. In this embodiment, the control unit 21 performs an operation for stopping the fitting work, an operation for retraction in an opposite direction from the fitting direction, an operation for stopping the conveying device 2, an operation in which these operations are combined, or the like.

In addition, when the second feature values are equal to or less than the predetermined reference value in step S1-6 and the detection value of the force sensor 32 exceeds a predetermined reference value (step S1-8), the control unit 21 performs a second abnormality response operation (step S1-9). When the detection value of the force sensor 32 exceeds the predetermined reference value, it is highly likely that an abnormal force is acting on the component 110, the item 100, or the like. Because of this, the control unit 21 performs the following operation as the second abnormality response operation. Specifically, the control unit 21 performs an operation for stopping the robot 10, an operation for moving the robot 10 in a direction for escaping from the direction of the force detected by the force sensor 32, an operation for stopping the conveying device 2, an operation for retraction in an opposite direction from the fitting direction, an operation for stopping the conveyance, an operation in which these operations are combined, or the like. In this embodiment, the control unit 21 performs the operation for stopping the robot 10.

In contrast, the control unit 21 determines, in the case in which the detection value of the force sensor 32 is equal to or less than the predetermined reference value in step S1-8, whether the fitting work has been completed (for example, whether the distance advanced in the Z-direction has exceeded a predetermined value is determined) (step S1-10), and transmits a predetermined movement instruction or operation instruction to the arm 10a and the hand 30 in the case in which the fitting work has been completed (step S1-11). Accordingly, the hand 30 releases the component 110 and moves away from the component 110, and the arm 10a moves the hand 30 to a standby position or a location where the next component 110 is stocked. In addition, in the case in which the fitting work has not been completed in step S1-10, the steps from step S1-6 are repeated.

Note that, in the above-described embodiment, the control unit 21 may perform, on the basis of the feature-value detection program 23e, large-area detection processing for detecting the second feature values in a first area in the image data and may perform small-area detection processing in a second area in subsequently acquired image data. The small-area detection processing is processing for detecting the second feature values in the second area, which is smaller than the first area.

For example, the large-area detection processing is performed when there are large differences between the first feature values and the second feature values and the small-area detection processing is performed when the differences between the first feature values and the second feature values are equal to or less than a predetermined value. Accordingly, it is possible to achieve an improvement in processing speed, an improvement in processing precision, and so forth when the differences between the first feature values and the second feature values are decreased.

Separately from said processing or together with said processing, the control unit 21 may set, on the basis of the feature-value detection program 23e, an area containing the detected follow target 102 in the image data so as to serve as a detection area for the second feature values. For example, a detection area can be set by setting a bounding rectangle that is tangential to the outline of the detected follow target 102 and by enlarging the bounding rectangle by a predetermined magnification.

Also, the magnification may be changed in accordance with the size of the follow target 102, the distance between the visual sensor 50 and the follow target 102, or the like in the image data. For example, when the distance between the visual sensor 50 and the follow target 102 decreases, the movement amount of the follow target 102 in the image increases in the image data; therefore the magnification increases. Accordingly, the detections of the position and the orientation of the follow target 102 become efficient and accurate.

Figure 9:
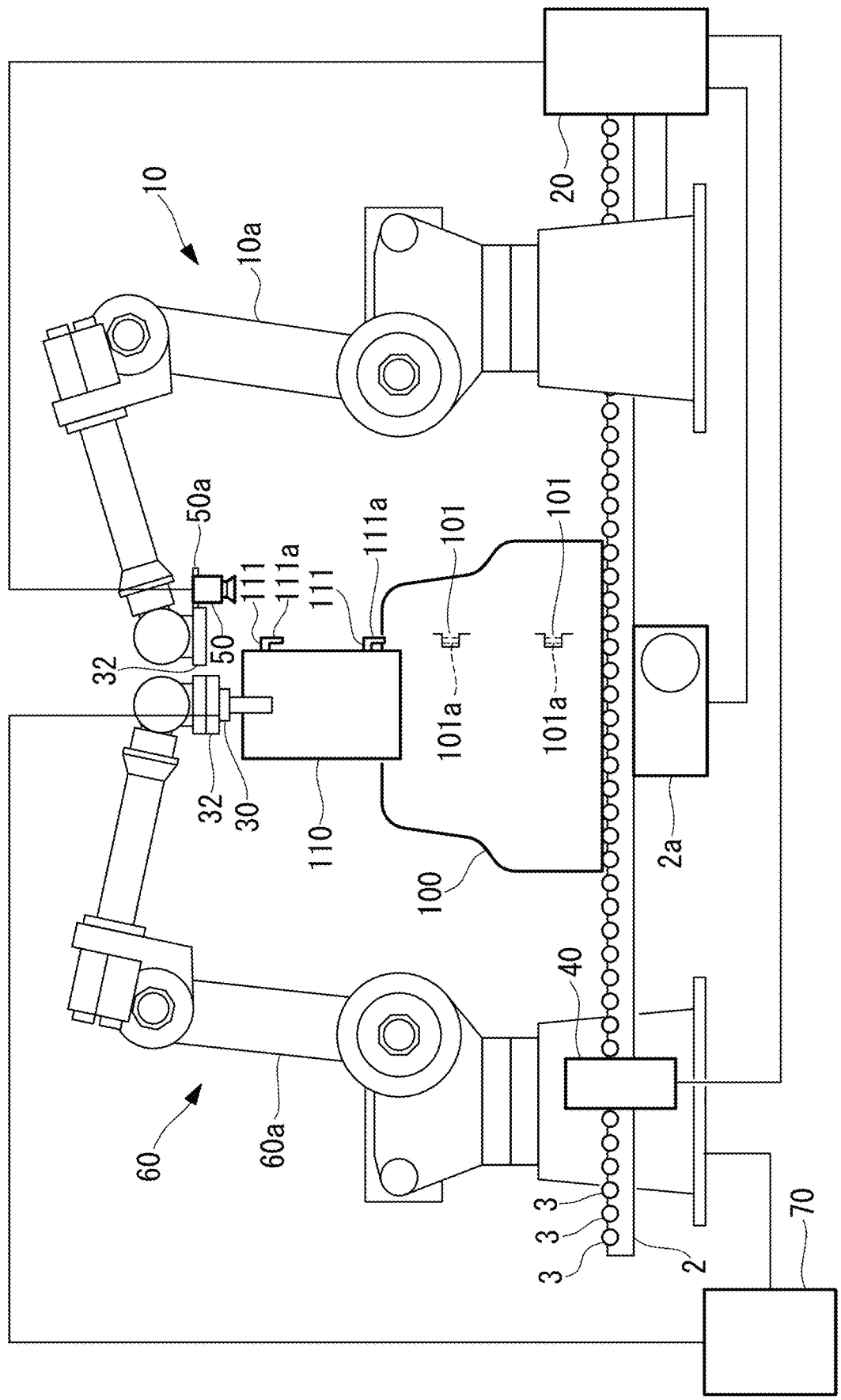
FIG. 9 is a configuration diagram showing, in outline, a modification of the work robot system of this embodiment.

In addition, as shown in FIG. 9, the hand 30, which serves as a tool, may be attached to a work robot 60 that is another robot. In this case, an arm 60a and the hand 30 of the work robot 60 are controlled by a controller 70. In one example, the controller 70 has the same configuration as the controller 20 and the arm 60a also has the same configuration as the arm 10a.

The position and the direction of the coordinate system of the visual sensor 50 and the position and the direction of a coordinate system of the robot 60 are associated with each other in the controller 70. In the state in which the control unit 21 is causing the visual sensor 50 to follow the follow target 102, the controller 70 causes the robot 60 to perform a motion in the coordinate system of the robot 60. The position and the orientation of the coordinate system of the robot 60 change in accordance with the position and the orientation of the coordinate system of the visual sensor 50; therefore, the controller 70 can perform work by employing the motion program 23b that is set on the basis of the coordinate system of the robot 60.

In this case also, when the controller 20 is causing the position and the orientation of the visual sensor 50 to follow the follow target 102, as described above, it is possible to cause the position and the orientation of the coordinate system of the robot 60 to follow the work target portion 101 on the basis of information about the movement instruction, information about the differences between the second detection amounts and the first detection amounts, and so forth. Because of this, when the robot 60 performs the work for fitting the shaft 111a of the component 110 into the hole 101a of the item 100 on the basis of the motion program 23b, the hand 30 of the robot 60 follows the item 100.

The controller 20 and the controller 70 may be connected to a higher-order control system such as a production management system, and information transfer between the controller 20 and the controller 70 may be performed via the higher-order control system.

Instead of the robot 60, it is also possible to employ a robot that has a rail provided above the conveying device 2 along the conveying device 2 and a movable arm attached to the rail in a movable manner. In this case, the visual sensor 50 is attached to a distal-end portion of the movable arm, and the movable arm can change the orientations of the distal-end portion thereof and the visual sensor 50, for example, around the X axis and around the Y axis.

Although it is preferable that the movable arm be capable of moving the positions of the distal-end portion thereof and the visual sensor 50 in a Y-axis direction, it is permissible that the movable arm cannot freely move the positions of the distal-end portion thereof and the visual sensor 50 in the Y-axis direction.

In this case also, it is possible to cause the position and the orientation of the visual sensor 50 attached to the movable arm to follow the follow target 102.

Even in the case in which the distal-end portion of the movable arm is not freely moved in the Y-axis direction, it is possible to cause, on the basis of the differences between the second feature values and the first feature values, the X-axis direction position of the visual sensor 50 attached to the movable arm and the orientation thereof around the X axis and the Y axis to follow the follow target 102. So long as said following is possible, even in the case in which the follow target 102 moves in the Y-axis direction in the image data, it is possible to achieve the same operational effects as those described above by detecting the movement amount thereof.

In addition, the shape or the like of the follow target 102 may additionally be detected as a second feature value. In this case, the storage portion 23 stores a first feature value related to the shape or the like of the follow target 102. The shape of the follow target 102 changes in accordance with the distance and angle between the arm 10a and the follow target 102; therefore, the following control is performed more accurately.

In addition, it is also possible to employ a plurality of visual sensors 50 and to cause the plurality of visual sensors 50 to respectively follow a plurality of follow targets 102. In this case, it is also possible to determine that the hand 30 attached to the arm 10a is disposed at a predetermined position and orientation with respect to the work target portion 101 of the item 100 when the follow targets 102 are disposed at respective predetermined positions in a plurality of image data acquired by the plurality of visual sensors 50.

As has been described above, the robot 10 of this embodiment includes: at least one visual sensor 50 provided on the arm 10a; and the storage portion 23 that stores the first feature values so as to serve as the target data for causing the visual sensor 50 provided on the arm 10a to follow the follow target 102. Also, in this embodiment, the second feature values related to at least the current position and orientation of the follow target 102 are detected by employing the images obtained by the visual sensor 50.

Also, the movement instruction for the arm 10a is calculated on the basis of the differences between the second feature values and the first feature values. In addition, while causing the visual sensor 50 to follow the follow target 102, the movement instruction calculation and the arm movement based on the movement instruction are repeated. Because of this, it is possible to cause the relative position and the relative orientation of the hand 30 with respect to the item 100 conveyed by the conveying device 2 to gradually approach the target data. This feature is useful for causing the motion of the arm 10a of the robot 10 to accurately follow the item 100 being conveyed by the conveying device 2.

In addition, in this embodiment, a model of the follow target 102 is employed as a first feature value. In the case in which the feature portion of the item 100 is the follow target 102, the control unit 21 performs a matching search between the feature portion in the image data acquired by the visual sensor 50 and the model that has been subjected to the projective transformation and can, thereby, obtain the position and the orientation (second feature values) of the feature portion in the image data.

Said configuration is useful for causing the relative position and the relative orientation of the visual sensor 50 with respect to the follow target 102 of the item 100 conveyed by the conveying device 2 to accurately approach the target data. The feature portion may be a figure provided on a surface of the item 100.

In addition, in this embodiment, the movement instruction is adjusted by employing at least the feedforward control. With said configuration, control is performed, by means of the feedforward control, in consideration of a trend in the movement of the item 100 due to the conveying device 2 or the like, and this feature is useful for causing the relative position and the relative orientation of the visual sensor 50 with respect to the follow target 102 of the item 100 to quickly and accurately approach the target data.

In addition, in this embodiment, the control unit 21 calculates, before detecting the second feature values, a pre-work movement instruction for bringing the follow target 102 into the detection area of the visual sensor 50 by employing the data acquired by the visual sensor 50 or another sensor 40. Because of this, the visual sensor 50 is disposed, in a short period of time, at a position necessary for performing the following before the following control of the arm 10a is performed.

In addition, the work robot system of this embodiment includes the conveying device 2 and the robot 10, and the robot 10 performs predetermined work on the item 100 in a state in which the visual sensor 50 provided on the robot 10 is following the follow target 102. Alternatively, with the work robot system of this embodiment, the work robot 60 performs predetermined work on the item 100 by employing the information about the movement instruction for causing the visual sensor 50 provided on the robot 10 to follow the follow target 102 or the information employed to calculate the movement instruction.

In the case in which the work robot 60 is employed, it is possible to perform the predetermined work on the item 100 at a location away from the visual sensor 50. A plurality of work robots 60 may perform the predetermined work on the item 100 by employing the above-described information.

In addition, the work robot system of this embodiment additionally includes the force sensor 32. The force sensor 32 detects a force generated by the component 110 or the hand 30 supported by the robot 10 coming into contact with the item 100 or a force generated by the component 110 or the hand 30 supported by the work robot 60 coming into contact with the item 100.

In addition, when the predetermined work is performed, the controller 20 or 70 of the robot 10 or the work robot 60 causes the hand 30 provided on the robot 10 or the work robot 60 to follow the item 100 by employing the detection value of the force sensor 32.

Because the detection value of the force sensor 32 is also employed in the following control, it is possible to further enhance the precision of the following control. Here, there are cases in which it is difficult to associate the relative orientation of the hand 30 with respect to the item 100 with the detection value of the force sensor 32; however, because said relative orientation is corrected in this embodiment, the precision of the following control is effectively enhanced.

In addition, with the work robot system of this embodiment, when the second feature values fluctuate beyond the predetermined reference value, the abnormality response operation is performed by at least one of the controller 20 or 70 of the robot 10 or the work robot 60 that performs the predetermined work and the conveying device 2. Accordingly, it is possible to effectively prevent damage to the robots 10 and 60, the item 100, and the component 110 while the following control is being performed.

In addition, with the work robot system of this embodiment, the follow target 102 is part of the item 100. With said configuration, the position of the follow target 102 in the item 100 is fixed, and said feature is useful for further enhancing the precision of the following control.

In addition, a machining tool may be supported at the distal-end portion of the robot 10 or the work robot 60, and the robot 10 or the work robot 60 may perform, as the predetermined work, machining on the item 100 conveyed by the conveying device 2. In this case, the machining tool is a drill, a milling cutter, a drill tap, a deburring tool, or other tools.

In this case also, the effects similar to or the same as those described above are achieved as a result of bringing the machining tool close to the work target portion 101 in step S1-2, performing the above-described following control, performing the force control in accordance with contact between the machining tool and the work target portion 101, and so forth. In addition, the machining tool may be a welding gun, a welding torch, or the like.

In addition, it is possible to employ, as the conveying device 2, a conveying device that conveys the item 100 along a curved route, and it is also possible to employ a conveying device that conveys the item 100 along a winding route. In these cases also, the control unit 21 can cause the distal-end portion of the robot 10 or the work robot 60 to follow the work target portion 101 by employing the detection result of the visual sensor 50.

In addition, when the position of the work target portion 101 with respect to the robot 10 fluctuates beyond the predetermined reference value in step S1-6, the control unit 21 can perform the first abnormality response operation in step S1-7. Because of this, effects similar to or the same as those described above are achieved even in the cases in which the above-described conveying devices are employed.

In addition, another robot or an AGV (Automated Guided Vehicle) may move the item 100 instead of the conveying device 2. In this case also, effects similar to or the same as those described above can be achieved. Furthermore, in the case in which the item 100 is an automobile, an automobile frame, or the like, the item 100 on which a predetermined work is to be performed may be moved by means of an engine, wheels, or the like of the item 100. In these cases, the other robot, the engine, the wheels, or the like serves as the conveying device.

In addition, the item 100 may be conveyed by means of a shooter on which the item 100 slides down, rolls down, or drops due to gravity, instead of the conveying device 2. In this case, it is possible to cause an inclined shooter to vibrate by means of a vibration device to consequently make the movement of the item 100 on the shooter smooth. In these cases, the shooter, the vibration device, and so forth serve as the conveying device, and the item 100 being moved by means of the shooter is taken out by using a tool attached to the robot 10.

In this embodiment, the force sensor 32 is attached to the distal-end portion of the robot 10 or the work robot 60. In contrast, it is also possible to dispose the force sensor 32 between the conveying device 2 and the item 100, inside the item 100, or the like. In this case also, it is possible to perform the force control based on the detection value of the force sensor 32, and the effects similar to or the same as those described above are achieved.

In addition, the visual sensor 50 may be attached to a portion other than the wrist flange of the robot 10 or the work robot 60.

Note that the visual sensor 50 may be a stereo camera. In this case, it is possible to acquire a distance image data of the follow target 102 by using a pair of cameras, and the position and the orientation of the follow target 102 are identified by employing said image data and a corresponding 3D model.

Although the follow target of the visual sensor 50 and the work target of the robot 10 are different in this embodiment, the follow target of the visual sensor 50 and the work target of the robot 10 may be the same. It is possible to set the follow target and the work target to be the same, for example, in the case in which a slight positional displacement between the hand 30, which is the tool of the robot 10, and the work target is acceptable, in the case in which the follow target is always visible from the visual sensor 50 when performing work by means of the hand 30, which is the tool, and so forth.

Note that, in the above-described embodiment, the position, the orientation, and the size of the follow target 102 are disposed at the target positions in the image data acquired by the visual sensor 50, and the position and the orientation of the hand 30, which is the tool, are consequently disposed at the position and the orientation required for performing the predetermined work on the item 100. In contrast, the position and the orientation of the follow target 102 may be disposed at the target positions in the image data acquired by the visual sensor 50, and the position and the orientation of the tool attached to the robot 10 may consequently be disposed at the position and the orientation required for performing the predetermined work.

For example, in the case of work in which the distance between a tool and the item 100 hardly changes, such as laser welding, laser machining, or sealing agent application, in the case in which work can be performed even if the distance between a tool and the item 100 changes, and so forth, it is permissible not to use the size information that serves as a first feature value and the size information that serves as a second feature value.

In addition, in this embodiment, an example in which the trajectory of the follow target 102 in the robot coordinate system is calculated has been described; however, only the elapsed time of a specific motion (for example, stopping motion or restarting motion from a stopped state) of the follow target 102 in the robot coordinate system may be calculated and may be employed as the time constant of the specific motion.

Figure 10:
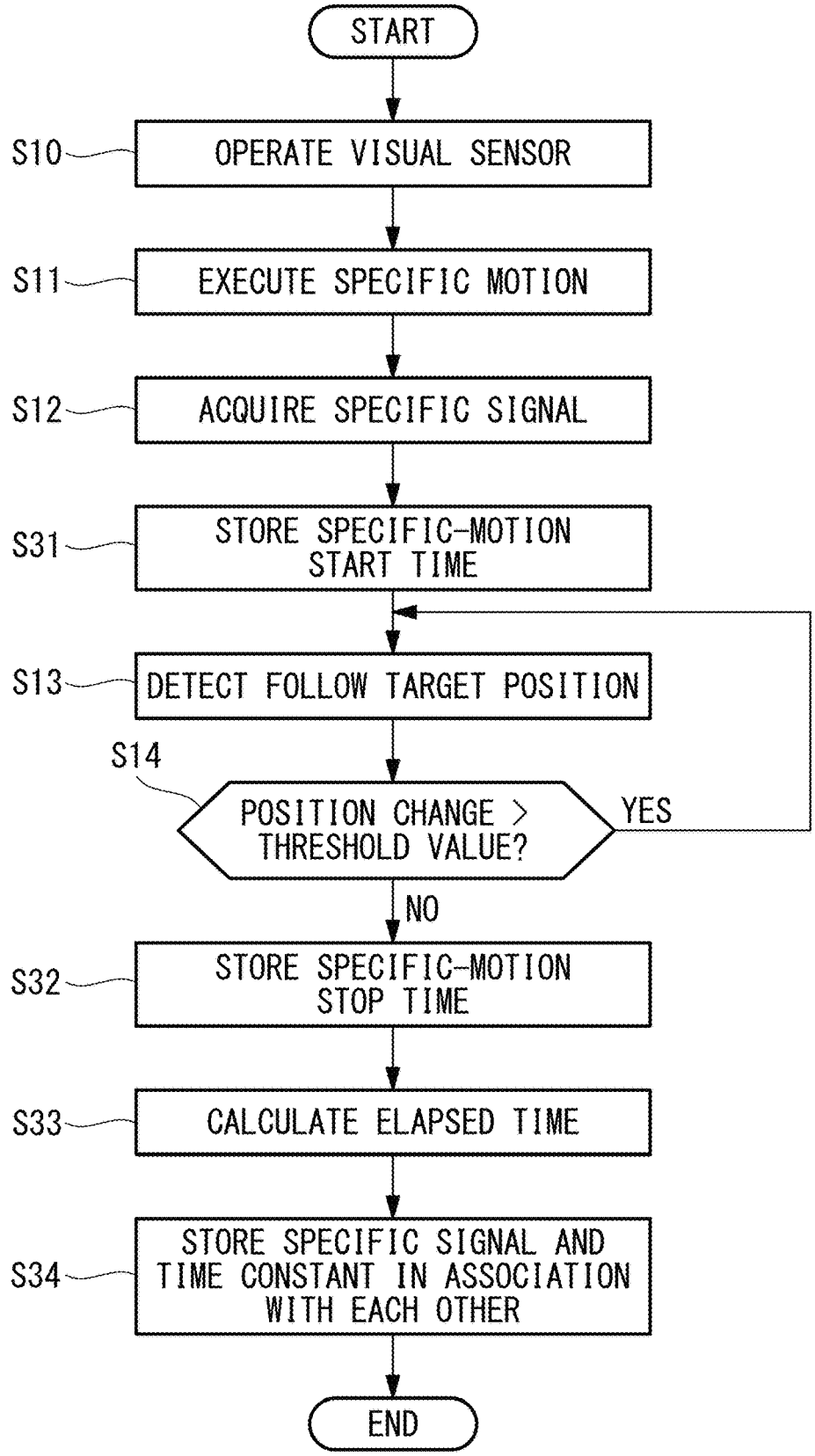
FIG. 10 is a flowchart for explaining time-constant generation processing in the modification of this embodiment.

In this case, as shown in FIG. 10, after the controller 20 acquires an emergency stop signal in step S12, the time at which the emergency stop signal was acquired is stored in the storage portion 23 as a specific-motion start time (step S31). Then, in the case in which the positional change becomes equal to or less than the predetermined threshold in step S14, the time at which the follow target 102 stopped is stored in the storage portion 23 as a specific-motion stop time (step S32).

Next, an elapsed time is calculated in the form of a difference between the stored specific-motion start time and specific-motion stop time (step S33), and the calculated elapsed time is stored in the storage portion 23 as the time constant in association with the signals with which the respective specific motions of the follow target 102 can be identified (step S34).

In addition, it is determined that a specific motion has ended (for example, coming to a complete stop or reaching a constant velocity after restarting a motion from a stopped state) by the visual sensor 50 detecting the position and the orientation of the follow target 102 on the basis of the acquired image data; however, alternatively, in the case of stopping of a specific motion, an operator may visually determine that the follow target 102 has stopped without employing the visual sensor 50 and may measure the elapsed time by employing a measuring device such as a stopwatch.

In addition, in the case in which it is possible to specify the time constant from the inverter setting of the conveying device 2, the time constant specified from the setting may be employed without modification.

Figure 11:
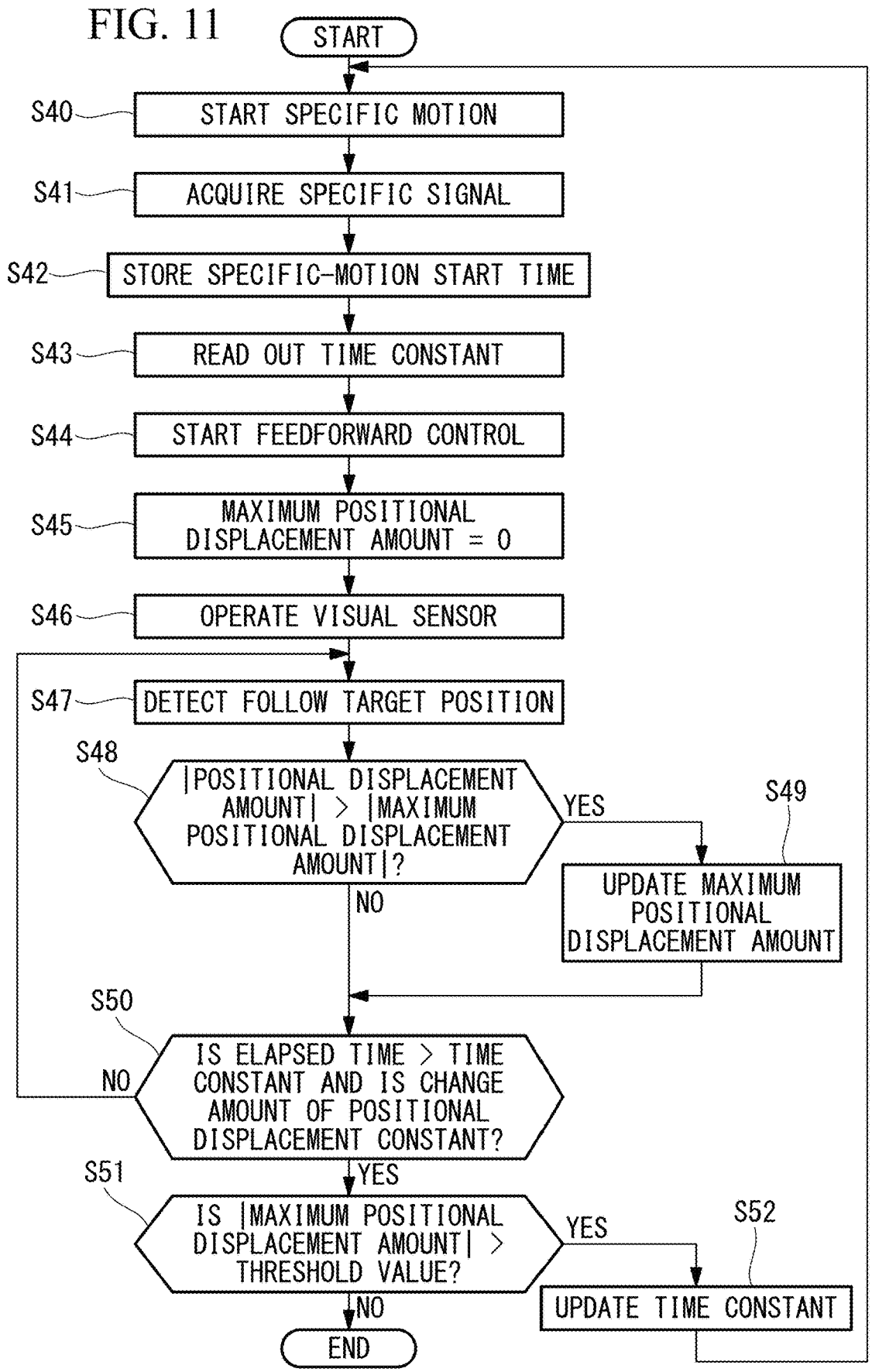
FIG. 11 is a flowchart for explaining a fine adjustment method for the time constant calculated by the time-constant generation processing in FIG. 10.

Next, a time-constant fine adjustment method performed in a state in which the elapsed time calculated in this way is stored so as to serve as the time constant will be described. In the state in which the robot 10 is operated, as shown in FIG. 11, the specific motion of the follow target 102 is started (step S40). Upon starting the specific motion, the controller 20 acquires the specific signal with which the specific motion can be identified (Sep S41), the time at which the specific signal was acquired is subsequently stored in the storage portion 23 as the specific-motion start time (step S42), the controller 20 reads out the set time constant from the storage portion 23 (step S43), and the feedforward control is started in accordance with the set time constant (step S44).

Also, the initial value of the maximum positional displacement amount of the follow target 102 is set to be zero (step S45). Subsequently, the visual sensor 50 provided on the arm 10a of the robot 10 acquires an image that contains the follow target 102 (step S46) and processes the acquired image to detect the position of the follow target 102 in the image (step S47).

In this state, whether the absolute value of the detected positional displacement amount of the follow target 102 is greater than the absolute value of the stored maximum positional displacement amount is determined (step S48), and, in the case in which the absolute value of the positional displacement amount of the follow target 102 is greater than the absolute value of the maximum positional displacement amount, the maximum positional displacement amount is updated and stored in the storage portion 23 (step S49).

In the case in which the absolute value of the positional displacement amount of the follow target 102 is equal to or less than the absolute value of the maximum positional displacement amount and after the maximum positional displacement amount is updated, whether a greater amount of time than the set time constant has passed and the change amount (a difference between a previous detection position and the current detection position of the follow target 102 in the robot coordinate system) of the positional displacement has become constant are determined (step S50). In the case in which a greater amount of time than the set time constant has not passed or the change amount of the positional displacement has not become constant, the steps from step S47 are repeated.

For example, the follow target 102 and the robot 10 stop in the case of stopping the specific motion; therefore, the change amount of the positional displacement becomes zero. In addition, the follow target 102 and the robot 10 reach a constant velocity in the case in which the specific motion restarted after stopping, the change amount of the positional displacement becomes zero, if the velocity is the same, and the change amount of the positional displacement over time becomes a non-zero constant value, if there is a velocity difference.

After a greater amount of time than the set time constant has passed and the change amount of the positional displacement over time has become a constant value, whether the absolute value of the maximum positional displacement amount has become greater than a predetermined threshold is determined (step S51).

Next, in the case in which the absolute value of the maximum positional displacement amount is equal to or less than the predetermined threshold, whether to increase or decrease the time constant is determined in accordance with the sign of the maximum positional displacement amount, and an amount in accordance with the absolute value of the maximum positional displacement amount is added to or subtracted from the time constant to update the feedforward control time constant stored in the storage portion 23 (step S52). Here, an increase/decrease amount ΔT in accordance with the absolute value of the maximum positional displacement amount may be calculated by using, for example, Equation (1), indicated below.

$$\Delta T = D/V \quad (1)$$

Here, D is the maximum positional displacement amount, and V is the constant velocity of the follow target 102.

Then, in step S51, the steps from step S40 are repeated until the absolute value of the maximum positional displacement amount becomes equal to or less than the predetermined threshold, and the processing ends when the absolute value of the maximum positional displacement amount becomes equal to or less than the predetermined threshold.

In addition, although an example in which the specific motion is executed as a result of the follow target 102 accelerating or decelerating immediately after the point in time when the specific signal with which the specific motion can be identified is acquired has been described, alternatively, the follow target 102 may be accelerated or decelerated in accordance with the specific signal after a predetermined time interval from the point in time at which the specific signal is acquired. In this case, an arbitrary time is set as the predetermined time interval.

In addition, in this embodiment, the feedforward-control input value acquired by means of the above-described method may be used in another robot that performs work with respect to the same conveying device (a conveying device that is identical as a device or another conveying device having the same specification and setting) as the conveying device 2 that conveys the item 100.

Figure 12:
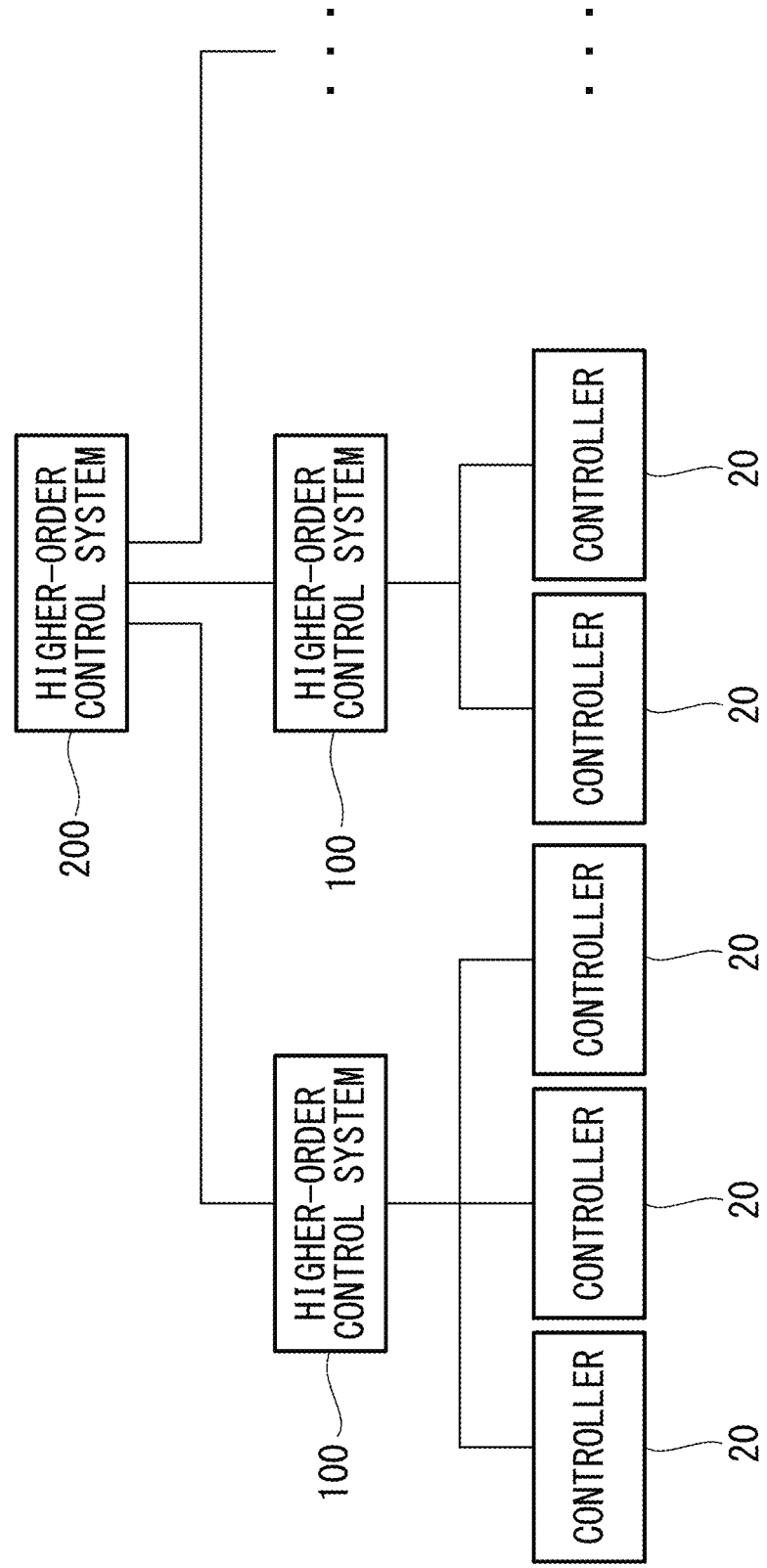
FIG. 12 is a block diagram of a management system having the controller of this embodiment.

In addition, in this embodiment, as shown in FIG. 12, a plurality of controllers 20 may be connected to higher-order control systems 100. The higher-order control systems 100 are, for example, computers that are connected to the plurality of controllers 20 via wired connections, computers disposed in the same site as the plurality of controllers 20, or the like. The higher-order control systems 100 are sometimes referred to as fog computers. The higher-order control systems 100 can be production management systems, shipping management systems, robot management systems, department management systems, or the like.

The plurality of higher-order control systems 100 may be connected with another higher-order control system 200 or the like. The other higher-order control system 200 is, for example, a cloud server that is connected to the plurality of higher-order control systems 100 via wired or wireless connections. For example, a management system is formed by the plurality of controllers 20 and the higher-order control systems 100.

Each of the higher-order control systems 100 includes a control unit having a processor and so forth, a display device, a storage portion having a non-volatile storage, a ROM, a RAM, and so forth, and an input device which is a keyboard, a touchscreen, an operation board, or the like, among others.

Figure 13:
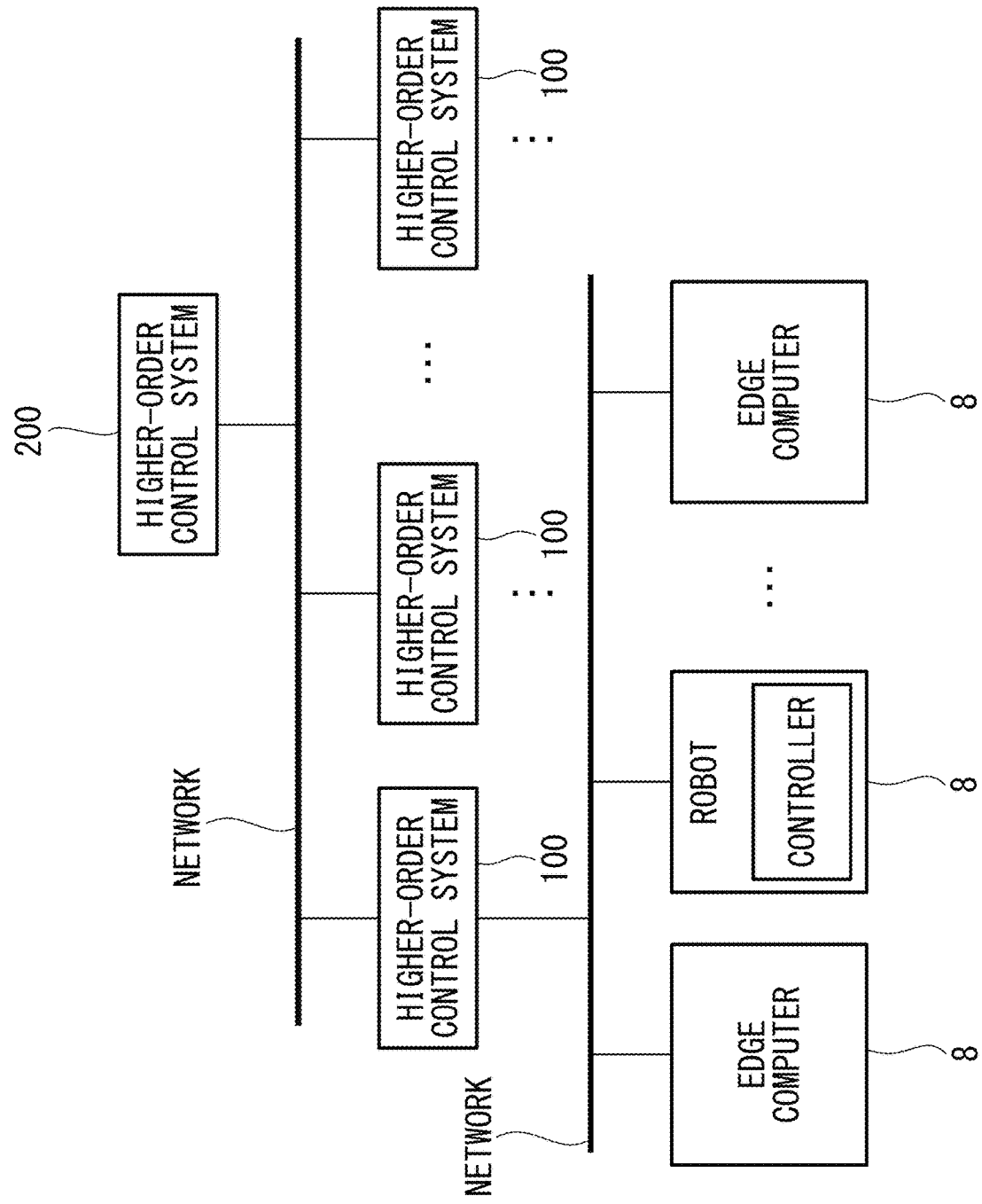
FIG. 13 is a block diagram of a system having the controller of this embodiment.

Such a system may include, as shown in FIG. 13, a plurality of edge computers 8, a plurality of higher-order control systems 100, and a single or a plurality of other higher-order control systems 200. In such a system, the controllers 20 and the robots 10 can be edge computers. Some of the controllers 20 and the robots 10 may be the higher-order control systems. Such a system includes a wired or wireless network.

The invention claimed is:

1. A following robot, comprising:
   a movable arm;
   at least one visual sensor provided on the movable arm;
   a storage unit that stores first feature values related to at least a position of a follow target and an input value for a feedforward control which is conducted at a time of emergency stop of the movable arm, the first feature values are used in a following control to make the movable arm follow the follow target;
   a feature-value detecting unit which detects, based on an image acquired by the visual sensor, second feature values related to at least a current position of the follow target; and
   a movement-amount computing unit which computes, by using a feedback control, a movement instruction for the movable arm based on differences between the second feature values and the first feature values, wherein
   the movement-amount computing unit is configured to adjust the movement instruction by using the feedforward control for the emergency stop based on the input value when movement-amount computing unit receives a specific signal of the emergency stop when the following control is being conducted.

2. The following robot according to claim 1, wherein the input value is calculated so that a trajectory of the movable arm becomes close to a trajectory of the follow target detected by the visual sensor in a state in which the movable arm is still.

3. The following robot according to claim 1, wherein the input value is calculated so that a trajectory of the movable arm becomes close to a trajectory of the follow target detected by another visual sensor that is fixedly installed.

4. A controller configured to control a movable arm on which at least one visual sensor is provided, the controller comprising:
- a storage unit that stores first feature values related to at least a position of a follow target and an input value for a feedforward control which is conducted at a time of emergency stop of the movable arm, the first feature values are used in a following control to make the movable arm follow the follow target;
- a feature-value detecting unit which detects, based on an image acquired by the visual sensor, second feature values related to at least a current position of the follow target; and
- a movement-amount computing unit which computes, by using a feedback control, a movement instruction for the movable arm based on differences between the second feature values and the first feature values, wherein
- the movement-amount computing unit is configured to adjust the movement instruction by using the feedforward control for the emergency stop based on the input value when movement-amount computing unit receives a specific signal of the emergency stop when the following control is being conducted.

* * * * *